Nov. 14, 1950 J. E. JOHANSSON 2,529,773
POWER PLANT
Filed Sept. 29, 1944 3 Sheets-Sheet 1

Johan E. Johansson
By Cushman Darby Cushman
attys

Nov. 14, 1950 J. E. JOHANSSON 2,529,773
POWER PLANT
Filed Sept. 29, 1944 3 Sheets-Sheet 3

Inventor:
John E. Johansson

Cushman Darby Cushman
Attorneys

Patented Nov. 14, 1950

2,529,773

UNITED STATES PATENT OFFICE 2,529,773

POWER PLANT

Johan Erik Johansson, Goteborg, Sweden, assignor to Aktiebolaget Gotaverken, Goteborg, Sweden, a corporation of Sweden Application September 29, 1944, Serial No. 556,433
In Sweden November 22, 1943

1 Claim. (Cl. 253—70)

Figure 1:
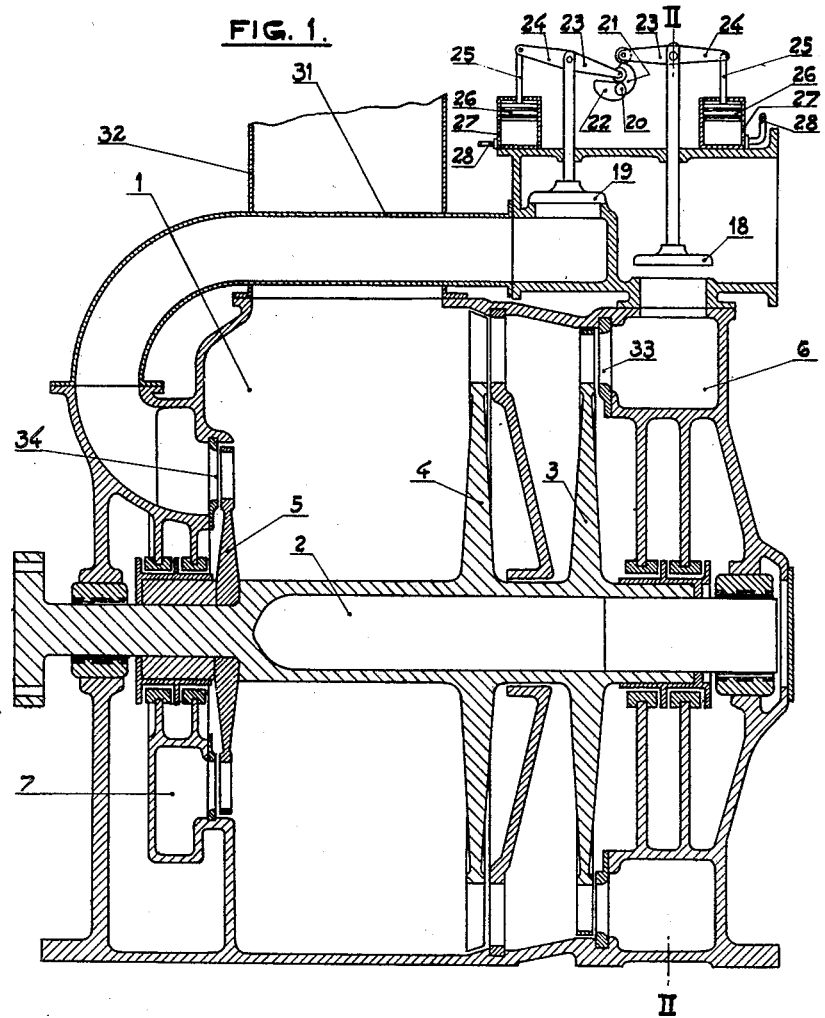
Figure 2:
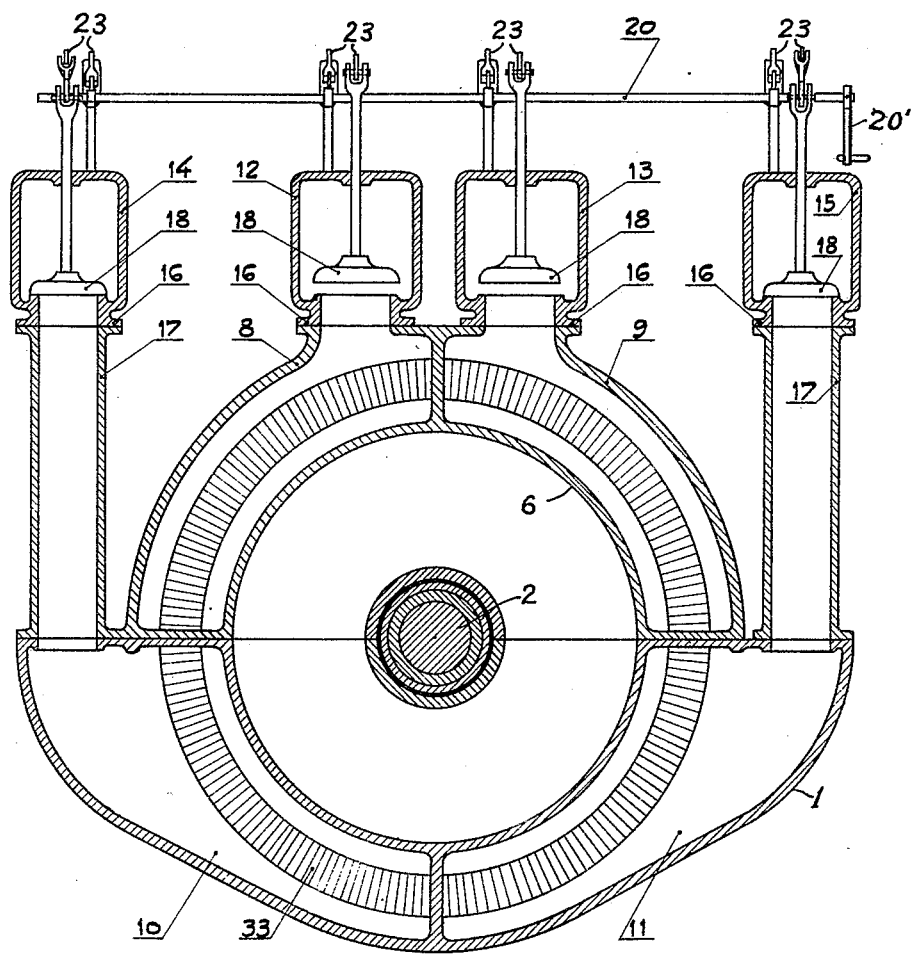
Figure 7:
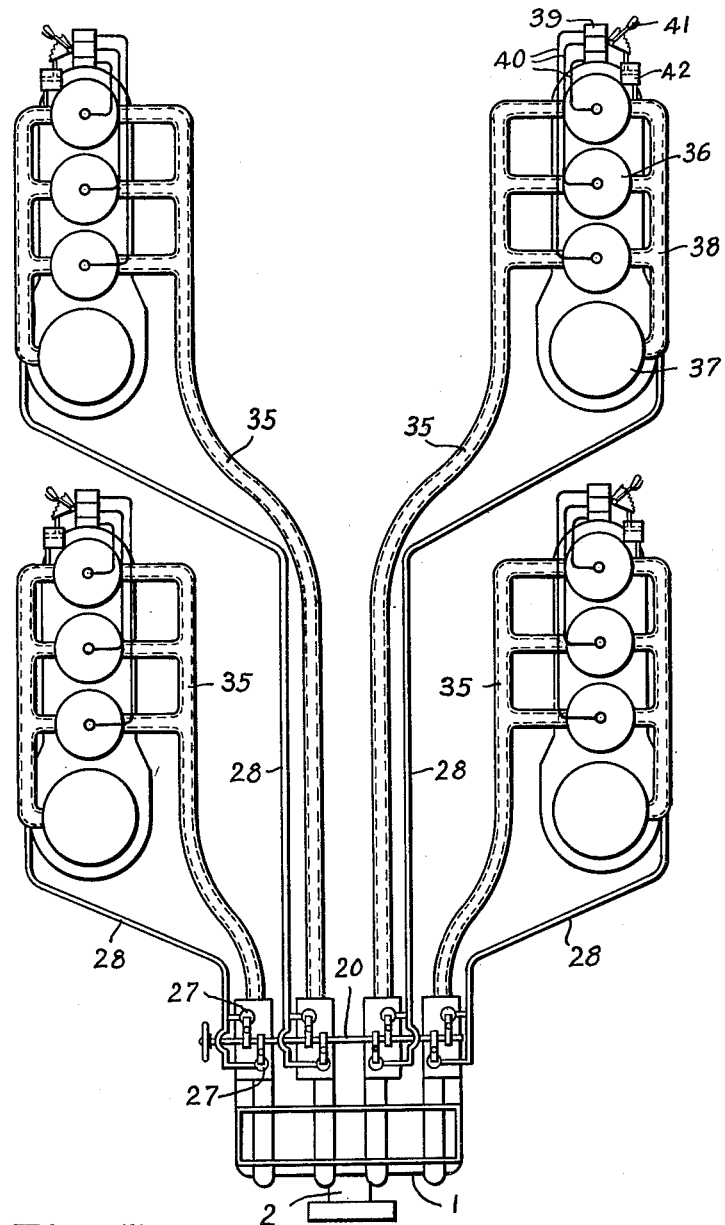

The present invention relates to a power plant of the type including gas producing engines and a gas turbine driven by gas from said engines. The principal object of the invention is to devise the power plant such as to render possible a very simple and reliable control of the plant. This and further objects are attained by the arrangement described in the accompanying drawings, in which:

Fig. 1 is an axial longitudinal section of an embodiment of a gas turbine belonging to the power plant. Fig. 2 is a section along the line II—II of Fig. 1. Figs. 3–6 illustrate various positions of a device for actuating the admission valve for the driving gas for the turbine. Figure 7 is a diagrammatic view showing the relation of the gas producing engines to the turbine.

In the turbine illustrated in Figs. 1 and 2, 1 denotes the casing of the turbine and 2 the turbine shaft. According to the embodiment shown, the turbine shaft carries two turbine wheels 3 and 4 for going forwards and a turbine wheel 5 for going backwards. The annular inlet chamber 6 for the fluid under pressure for the ahead turbine, and preferably also the corresponding inlet chamber 7 for the back turbine, are divided into separate sectors 8, 9, 10 and 11, each of which extends through an equal portion of the periphery, as will be seen from Fig. 2. Each of these sectors is connected with an individual admission member 12, 13, 14 and 15, respectively, and each of these admission members is provided with valves for controlling the supply of driving gas from the appertaining gas producing engine (not shown) to the turbine. Each admission member is devised as a constructional unit separated from the other admission members. For example, each admission member is provided with a flange 16 for bolting the admission member to the turbine casing or to a pipe 17 connected with the casing. Due to the fact that the admission members are separated from each other, heat stresses occurring as the hot driving gas passes through one of the admission members can not be transmitted to the remaining admission member or admission members when the latter are not supplied with driving gas.

As will best be seen from Fig. 1, each admission member is in the embodiment shown provided with two valves, one of said valves 18 controlling the supply of driving gas to the ahead turbine, whereas the other valve 19 controls the supply to the back turbine. Since it is important for obtaining the highest output in the turbine that driving gas can not be supplied to the turbine under other conditions than if the gas is assuming the pressure suitable for the operation of the turbine, the valves of the admission members are advantageously adapted to be actuated on the one hand, by an arbitrarily adjustable mechanism and, on the other hand, by the pressure of a fluid, which has a certain relation to the pressure of the fluid controlled by the admission valve such that said fluid must be at a certain pressure, in order to render possible opening of the admission valve upon actuating the arbitrarily adjustable mechanism. Since the driving fluid sources consist of gas producing engines, the pressure fluid actuating the valves advantageously consists of the scavenging air of the engines. Said scavenging air is at the same or at a somewhat higher pressure than the driving gas supplied by the engine. Further, the scavenging air is free from impurities which might obstruct the controlling members. In the embodiment illustrated, the arbitrarily adjustable mechanism includes a shaft 20 extending above all of the admission members and provided with cams 21 for each of the valves 18 of the ahead turbine and with cams 22 for the valves 19 of the back turbine. The shaft 20 is provided with suitable operating means such as the handwheel 20' for turning the same so as to obtain the various cam positions shown in Figures 3 to 6.

Each of the valves 18, 19 is suspended between the ends of a two-armed lever, one arm 23 of which is adapted to be actuated by the cams 21 or 22, while the other arm 24 is linked to the rod 25 of a piston 26 which is movable in a cylinder 27. On that side of the piston which is located in the closing direction of the valve, the cylinder is by means of a piping connection 28 in communication with the scavenging air conduit. The mode of operation of this arrangement will now be described with reference to Figs. 3–6.

Figure 3:
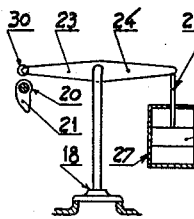
Figure 4:
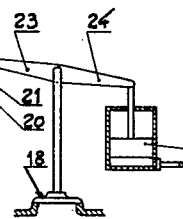
Figure 5:
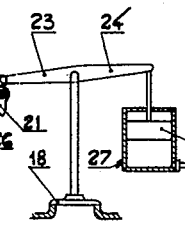
Figure 6:
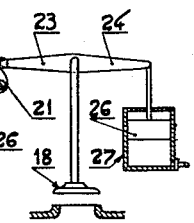

In the position of rest illustrated in Fig. 3, the end of the lever arm 23, which may be provided, for instance, with an anti-friction roller 30, is located at some distance above the shaft 20. There is no fluid under pressure below the piston 26 in the cylinder 27, and, consequently, the gas producing engine is not in operation or is not supplying, for some reason or other, driving gas at the required pressure. If now the shaft 20 in accordance with Fig. 4 is turned in a manner such that the cam 21 engages the lever arm 23 and turns the same upwards, the valve 18 will still not be lifted, and the piston 26 will move downwards in the cylinder 27, since the cylinder does not contain controlling fluid at a pressure counteracting the movement of the lever arm 24. Fig. 5 illustrates the operation of the controlling device if sufficient fluid under pressure is existent in the cylinder 27 below the piston 26, while the cam 21 is not in the opening position. The lever arm 24 will be turned upwards, while the lever arm 23 will be turned downwards through the clearance between the shaft 20 and the arm 23. The valve 18 is still closed. If the cam 21 is turned from the position shown in Fig. 5 to the position shown in Fig. 6 and if there is still controlling fluid of sufficient pressure below the piston 26, the valve 18 will be opened.

As will be seen from Fig. 1, the cams 21 and 22 for the valves 18 and 19 belonging to an admission member for the ahead turbine and back turbine, respectively, are angularly displaced relative to each other in a manner such that, upon turning of the shaft 20 in the one or the other direction, one of the valves will be opened, while the other valve will be closed. It will also be seen from this figure, that one or more of the piping connections 31 from an admission member to the back turbine may extend through the turbine exhaust conduit 32. This arrangement may be advantageous from the point of view of construction and is unimportant with respect to the output, since the back turbine is used in exceptional cases only.

The turbine wheel 3 located nearest the turbine inlet is advantageously devised as an impulse wheel, whereas the turbine wheel 4 is devised as a reaction wheel. Obviously, a plurality of impulse wheels and reaction wheels may be provided. The wheel 5 of the back turbine is preferably devised as an impulse wheel. Numerals 33 and 34 indicate guide vane rims for the impulse wheels of the ahead turbine and back turbine, respectively. The temperature drop in the guide vanes 33 and 34 is preferably so great that, if all of the driving gas sources are supplying gas to the turbine and if the latter is running at full load the pressure drop in the guide vanes becomes critical or almost critical. As a result thereof, the flow of gas from one of the driving gas sources will not noticeably influence the flow of gas from another driving gas source.

The arrangement according to the invention results in that the total output of the plant can be controlled by putting the various driving gas producing engines into or out of operation. The control, for the rest, is effected automatically, and the turbine will in all cases work under favourable operating conditions.

Figure 7 shows the four individual gas producing engines, with separate conduits 35, which supply driving fluid to the four separate admission members of the gas turbine 1. Each gas producing engine comprises a three-cylinder internal combustion engine 36 and a combustion and scavenging air compressor 37 directly driven by the engine. The scavenging air is supplied to the engine through a conduit 38. The conduit 28 indicated in Figs. 1 and 3 is connected to the conduit 38. Reference numeral 39 denotes fuel pumps which deliver fuel to the cylinders through fuel pipes 40. The fuel quantity is controlled by a control lever 41 which, as diagrammatically indicated by the cylinder and piston device 42, is acted upon by the pressure in the scavenging air conduit 38 in a manner such that the supply of fuel is reduced when the scavenging air pressure is increased and vice versa. The supply of fuel is thus controlled both manually and in response to the scavenging air pressure.

It will be obvious that the scope of the invention includes various constructional modifications.

What I claim is:

An elastic fluid turbine including a casing having a rotatable turbine shaft therein, said shaft having two forward turbine wheels and a reverse turbine wheel mounted thereon, one of said forward wheels and the reverse wheel constituting impulse wheels and the other forward wheel a reaction wheel, said turbine having individual admission members for supplying driving fluid to the turbine, one of said forward wheels having a blade rim mounted thereon, annular inlet chambers for the forward and reverse turbine wheels, each of said chambers being divided into separate arcuate sectors including a forward sector and a reverse sector that communicate individually with each of said individual admission members, spaced valve means in the admission member for controlling the flow of the driving fluid to the forward and reverse wheels, each of said admission members being arranged to receive driving fluid separately from separate sources of elastic driving fluid, and guide vanes in front of the blade rim and communicating directly with a complementary inlet chamber sector, said guide vanes being constructed so that the pressure drop therebetween becomes substantially critical at normal supply of driving fluid to the blade rim.

JOHAN ERIK JOHANSSON.

REFERENCES CITED

The following references are of record in the file of this patent:

UNITED STATES PATENTS

| Number | Name | Date |
|---|---|---|
| 1,092,947 | Pape | Apr. 14, 1914 |
| 1,209,918 | Westinghouse | Dec. 26, 1916 |
| 1,213,791 | Bailey | Jan. 23, 1917 |
| 1,235,936 | Shaw | Aug. 7, 1917 |
| 1,235,992 | Metter | Aug. 7, 1917 |
| 1,243,131 | Belluzzo | Oct. 16, 1917 |
| 1,461,699 | DeSantis | July 10, 1923 |
| 1,847,031 | Wiberg | Feb. 23, 1932 |
| 1,856,024 | Büchi | Apr. 26, 1932 |
| 2,005,821 | Büchi | June 25, 1935 |
| 2,123,009 | Johansson | July 5, 1938 |
| 2,253,530 | Pescara | Aug. 26, 1941 |
| 2,338,548 | Sheppard | Jan. 4, 1944 |

FOREIGN PATENTS

| Number | Country | Date |
|---|---|---|
| 788,540 | France | July 29, 1935 |